Figure 2:
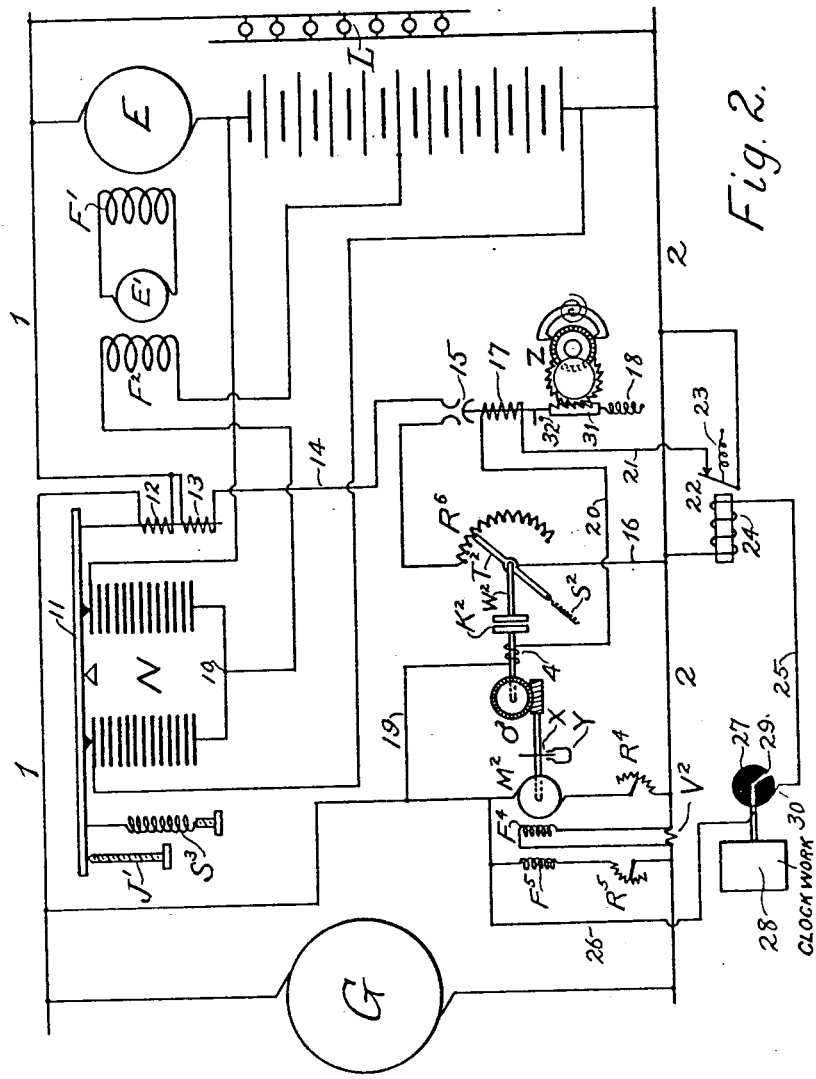

J. L. WOODBRIDGE.
SYSTEM OF ELECTRICAL DISTRIBUTION.
APPLICATION FILED DEC. 6, 1909.

1,033,509.

Patented July 23, 1912.

2 SHEETS—SHEET 2.

WITNESSES:
Frank E. French
K. W. Gilligan

INVENTOR
Joseph L. Woodbridge
BY
Augustus B Stoughton
ATTORNEY.

UNITED STATES PATENT OFFICE.

JOSEPH L. WOODBRIDGE, OF PHILADELPHIA, PENNSYLVANIA.

SYSTEM OF ELECTRICAL DISTRIBUTION.

1,033,509.  Specification of Letters Patent.  Patented July 23, 1912.

Application filed December 6, 1909. Serial No. 531,617.

*To all whom it may concern:*

Be it known that I, JOSEPH L. WOODBRIDGE, a citizen of the United States, and a resident of Philadelphia, in the county of Philadelphia and State of Pennsylvania, have invented a certain new and useful System of Electrical Distribution, of which the following is a specification.

This invention relates to systems of distribution in which a storage battery is employed to relieve the generating machinery of certain portions of load, and is particularly applicable to cases where power is purchased on a maximum demand basis, this demand being determined by the average load for a specified period, as for example, one hour.

In certain cases contracts for the purchase of power are entered into in which the purchaser is required to pay an additional sum if his average load for a period of one hour, as determined by hourly readings of an integrating wattmeter, exceeds a predetermined amount. The load may exceed this amount for a portion of the hour without involving any penalty provided that during the balance of the hour the load is sufficiently reduced to bring the entire average within the specified limit. In such case a storage battery may be installed to take all of the load in excess of the predetermined limit. If, however, the load during the first half of the hour should be above this limit, while during the second half it is below the limit, the storage battery would have been called upon to discharge unnecessarily during the first half hour.

The object of the present invention is to provide means for relieving the storage battery of this unnecessary work.

In general the apparatus includes a storage battery which during the first portion of any given period of time is normally floating on the system, or may be charging or discharging, but this average charge or discharge is not controlled by the variations of load. A device, however, is provided which does take into account the difference between the average load on the generating apparatus and the predetermined limit in such a way that if the average is above this limit during the first part of the period mentioned this device will fix the average for the second part of the period at a point sufficiently below that limit to bring the average for the entire period of time within said limit. During the second part of the period the battery is automatically caused to discharge to maintain the average load below the point fixed by the device above mentioned operating in response to the average load during the first part of the period.

My invention will be more clearly understood by reference to the accompanying drawings, in which—

Figure 1, shows one embodiment of the invention, and Fig. 2, shows a modification.

In Fig. 1, G is a generator supplying current to the circuit 1—2, having a variable load L. A storage battery B with its booster E is connected across the circuit 1—2. The field $F^1$ of the booster E is controlled by the double pole rheostat $R^1$, this rheostat being arranged in the usual manner to vary the amount and direction of current in the field $F^1$ according to the position of the arm $T^1$. This arm is normally held against an adjustable stop J by means of a spring S, but may be rotated away from this stop by the shaft $W^1$ driven by the motor $M^1$ through a worm gear $O^1$ and a magnetic clutch $K^1$. When the arm is rotated in this direction it will send current through the field $F^1$ of the booster E in the direction to cause the battery to discharge. When the arm of the rheostat $R^1$ is drawn against the stop the current in the field $F^1$ may be such as to cause the battery either to charge or discharge or to float according to the adjustment of the stop J. The magnetic clutch $K^1$ is energized by a coil 3 connected across the circuit 1—2 by means of conductors 5 and 8. In the latter is inserted an interrupting device consisting of a conducting disk C, part of whose periphery is covered by insulating material D. This disk is driven at constant speed by clock work of any suitable design indicated at A. The effect of this will be to couple the shaft $W^1$ to the motor $M^1$ for a part of the revolution of the disk C, while during the rest of the revolution the shaft $W^1$ will be uncoupled and the arm $T^1$ will be drawn back against the stop J.

The armature of the motor $M^1$ is supplied with current derived from the circuit 1—2, whose amount may be adjusted by the rheostat $R^2$ whose resistance is so large that the resultant current going through the armature is substantially constant. This motor is provided with two field windings $F^2$ and $F^3$, the former being connected across a resistance $V^1$ in the circuit 2 so as to provide excitation proportional to the load on the generator G. The field winding $F^3$ is connected in shunt across the circuit 1—2 and the current in this winding is controlled by the rheostat $R^3$. The excitations produced by the field windings $F^2$ and $F^3$ are opposed to each other and whenever they are equal there will be no resultant field and the motor $M^1$ will be at rest. If the excitation of $F^2$ exceeds that of $F^3$ the motor will rotate in one direction while if $F^2$ is less, the motor will rotate in the opposite direction. Whenever the clutch $K^1$ is in operation the motion of the motor $M^1$ will be transmitted to the arm $T^1$ but very slowly as compared with the fluctuations of load on the generator G. If, therefore, the average value of these fluctuations produces an excitation in $F^2$ equal to that in $F^3$ there will be practically no change in the position of the arm $T^1$. If, however, the average effect of $F^2$ is greater than $F^3$ the arm $T^1$ will gradually be moved in the direction to cause the battery to discharge or increase its rate of discharge until the generator G is relieved of a sufficient amount of load to produce a balance between $F^2$ and $F^3$ when the arm $T^1$ will come to rest or be moved so slightly in either direction by the fluctuations of current in $F^2$ above and below the average that the practical result will be the same as if the arm $T^1$ were actually at rest. The effect of the apparatus thus far described is to bring the load on the generator G to an average value, which is determined by the excitation of the field winding $F^3$ whenever the magnetic clutch $K^1$ is operative. The excitation of the field winding $F^3$ is determined by the position of the arm $T^3$ of the rheostat $R^3$. This arm is driven by a worm gear operated by a motor $M^2$. The armature of this motor is supplied with current by connection across the circuit 1—2, this current being adjustable by means of a rheostat $R^4$ whose resistance is so large that the resultant current going through the armature is substantially constant. The motor is provided with two field windings $F^4$ and $F^5$, $F^4$ being connected across a resistance $V^2$ in the circuit 2 and carrying current proportional to the load on the generator G, while $F^5$ is a shunt winding connected across the circuit 1—2 and adjustable by means of the rheostat $R^5$. This motor will therefore operate in one direction or the other according to whether the excitation of the winding of $F^4$ is greater or less than that of $F^5$ and will be at rest when these two excitations are equal. A damping device is shown consisting of a conducting disk X mounted on the shaft of the motor $M^2$ and revolving in the field of the magnet Y. This is designed in the usual manner to cause the speed of the motor $M^2$ to vary in proportion to its field excitation by providing a counter torque which varies in proportion to the speed. The motor $M^2$ drives the arm $T^2$ by means of a magnetic clutch $K^2$ excited by the coil 4 connected across the circuit 1—2. The circuit of the coil 4 is completed through a conducting disk H driven by the clock work A. In the periphery of this disk is a short section of insulating material I which will open this circuit momentarily once in each revolution of the disk. When the clutch $K^2$ is released the arm $T^2$ is drawn back to its normal position by a spring $S^2$.

The operation of this apparatus will then be as follows: At the beginning of any period of time, for example, an hour, during which the disks C and H make one complete revolution, the circuit of the coil 4 will be momentarily interrupted and the arm $T^2$ will be restored to its normal position by the spring $S^2$, this normal position giving an excitation in the field $F^3$ equal and opposite to the excitation produced in the field winding $F^2$ by the average load within which it is desired to hold the output of the generator G. After this momentary interruption the coil 4 will again be excited and the clutch $K^2$ energized and the motor $M^2$ will move the arm $T^2$ slowly in one direction or the other depending upon whether the average load on the generator G is greater or less than that for which the excitation of the field $F^3$ has been adjusted. If the average load on the generator G is just equal to the average within which the generator load is to be kept for the entire hour, the two field windings $F^4$ and $F^5$ will on the average balance each other and the arm $T^2$ will remain substantially in its normal position. If, however, the average load on the generator is greater than this amount the arm $T^2$ will be gradually moved to reduce the excitation in the field winding $F^3$. By proper design of the apparatus this reduction of excitation may be made proportional to the excess of average load in ampere hours. During the first half of the one hour period the circuit of the coil 3 of the clutch $K^1$ will be interrupted by the insulation D and the arm $T^1$ will be held against the stop J. During this time the battery may be either floating or slightly charging if desired. At the end of the first half hour the circuit of the coil 3 will be closed and will remain closed for the balance of the one hour period. During the last half hour the motor $M^1$ will attempt to move the arm $T^1$ in one direction or the other according to whether the average load on the generator G produces an excitation in the winding $F^2$ greater or less than the excitation of $F^3$. If the excitation of $F^2$ is greater, the arm $T^1$ will be moved away from the stop J causing the battery to discharge, and this motion of the arm $T^1$ will continue until the discharge of the battery has reduced the load on the generator G so as to equalize the excitation of the field windings $F^2$ and $F^3$ and the motor $M^1$ will then come to rest. If the motor attempts to drive the arm $T^1$ in the opposite direction it will come against the stop J and then the clutch $K^1$ will slip, no further motion of the arm T being produced. Thus the battery will not be caused to charge in order to maintain the average load at the point fixed by the excitation of $F^3$ but will be caused to discharge to prevent the average from exceeding this amount. The average load fixed by the excitation of $F^3$ for the last half of the one hour period will be greater or less than normal according to whether the average load during the first half of the period has been less or greater, this result being produced by the motion of the arm $T^2$ during the first half of the hour, as described above. Thus the entire load for the whole hour will be prevented from exceeding the normal predetermined amount but may be anything below this amount.

In Fig. 2, the same results are accomplished with a somewhat different combination of apparatus. The battery B with its booster E in series is connected across the circuit 1—2 in parallel with the generator G the same as in Fig. 1. The field $F^1$ of the booster is energized by an exciter $E^1$ whose field $F^2$ is controlled by the carbon regulator N. This regulator is a well known piece of apparatus consisting of two piles of carbon disks connected in series across the battery terminals with a circuit containing the field $F^2$ connected between a point 10 located in the circuit between the two carbon piles and the middle point of the battery. By means of a lever 11 the pressure on one set of piles may be increased and on the other set decreased or vice versa to control the amount and direction of current in the field winding $F^2$ in the well known manner. The pressure produced by the lever is controlled by an adjustable spring $S^3$ at one end and two co-operating solenoids 12 and 13 at the other end. The solenoid 12 is connected into the conductor 1 and carries the total load on the generator G. The solenoid 13 is connected across the conductors 1—2 by way of conductor 14, time switch 15, rheostat $R^6$ and conductor 16. An adjustable stop $J^1$ is shown bearing against the under side of the lever 11 so as to offset the tension of the spring $S^3$ at any desired point. It will be seen that with this arrangement so long as the combined pull of the solenoids 12 and 13 is less than the tension of the spring $S^3$, the latter will hold the lever against the stop $J^1$ and variations in the current strength in the solenoids will have no effect upon the operation of the regulator N. Whenever the combined pull of the two solenoids 12 and 13 is greater than the spring tension, the regulator N will come into operation in the normal manner exciting the booster by means of the exciter $E^1$ to cause the battery to discharge. When current is flowing in the solenoid 13 it is in the direction to assist solenoid 12. The flow of current in solenoid 13 is controlled by the time switch 15 and the rheostat $R^6$. The adjustment of the rheostat $R^6$ is controlled by apparatus identical with that shown in connection with the rheostat $R^3$ in Fig. 2. The arm $T^2$ of this rheostat is mounted on a shaft $W^2$ in which is inserted a magnetic clutch $K^2$ excited by the coil 4. The shaft $W^2$ is driven through the worm gear $O^2$ by means of a motor $M^2$. The armature of this motor is connected across the circuit 1—2 in series with a rheostat $R^4$ and the motor is provided with two field windings $F^4$ and $F^5$ of which the former is connected in parallel with a resistance $V^2$ connected into the conductor 2, while the latter is connected across the circuit 1—2 in series with the rheostat $R^5$. A magnetic damping device consisting of a conducting disk X revolving in the field of the magnet Y serves to control the speed of the motor $M^2$.

The time switch 15 is opened and closed by the operation of the solenoid 17, the spring 18 and the escapement mechanism Z. The solenoid 17 is connected in series with the coil 4 of the magnetic clutch $K^2$ across the circuit 1—2 by way of conductors 19, 20 and 21. In series with conductor 21 is a magnetically operated switch 22 which is held in a closed position by a spring 23 and is opened when the magnetic coil 24 is excited. The latter coil is arranged to receive an impulse of current once during every hour, or other given period of time, being connected across the circuit 1—2 by means of conductors 25 and 26. Connection between conductors 25—26 is made periodically by means of the revolving disk 27 which is operated by clock work indicated at 28 so as to make one revolution during each hour or other period of time determined upon. The disk 27 is made of insulating material but carries a sector 29 of conducting material, which by making contact with a brush 30 completes the circuit between conductor 25 and 26 once each hour. Returning now to the time switch 15 it will be seen that whenever the solenoid 17 is energized this latter tends to close the switch. This closing motion is however retarded by the rack 31 which gears with the escapement mechanism Z. This may be designed with a suitable escapement so as to require any predetermined period of time to elapse before the time switch 15 is closed. When the circuit of the solenoid 17 is opened, the spring 18 draws the rack 31 back to its normal position against the stop 32, the teeth of the rack being so shaped as to permit this.

The operation of this apparatus will then be as follows:—At the beginning of each hour the disk 27 operated by the clock work 28 is in such position as to close the circuit of the magnet coil 24 which will open the switch 22, thus releasing the time switch 17 which will be opened by the spring 18. At the same time the current in the coil 4 of the magnetic clutch K² will be interrupted and the arm T² of the rheostat R⁶ will be drawn back to its normal position by the spring S². The circuit of the magnet coil 24 being then immediately opened by the travel of the disk 27, the switch 22 will be closed by the spring 23 and the coil 4 and solenoid 17 will again be energized. The time switch 15 will then begin to close but the adjustment of the escapement mechanism Z is such that it will require, say, half an hour to close this switch. During this half hour there will be no current in the solenoid 13 of the carbon regulator N. During this period, therefore, only the solenoid 12 will act upon the carbon regulator and this regulator will be inoperative until a certain maximum load on the generator is reached, for example, such load as might open any automatic circuit breaker or fuse which may be inserted in the generator circuit. When the load on the generator reaches this point the battery will be caused to discharge to prevent any further increase of load on the generator. During this half hour however the motor M² is operating to adjust the setting of the rheostat R⁶ as described in connection with Fig. 1. That is, if the average load on the generator G produces an excitation in the field F⁴ greater than the excitation in the field F⁵ the motor will operate in the direction to cut down the resistance of the rheostat R⁶, setting it to permit a current in solenoid 13 greater than the normal when the switch 15 is closed. Upon the closing of the switch 15 at the end of the half hour, the two coils 12 and 13 coöperate for the last half of the hour and because of the current in the coil 13 a much smaller load on the generator will cause the battery to discharge. The greater the current in the coil 13, the smaller will be the current necessary in the coil 12 to bring the carbon regulator into action so that the amount of current in coil 13 as determined by the setting of the rheostat R⁶ will fix the limit of load on the generator during the last half of the hour. If the average load during the first half of the hour has been less than normal the motor M² will operate in the opposite direction and increase the resistance of the rheostat R⁶ and reduce the current in coil 13 during the last half hour, thus permitting a greater load to fall on the generator C, before the carbon regulator comes into action.

It will be obvious that changes may be made in the details without altering the spirit of the invention.

What I claim therefore and desire to secure by Letters Patent is:

1. In combination an electric circuit and its source, a storage battery operatively arranged with respect to the circuit, and apparatus responsive to the load on the source and adapted to control the division of load between the battery and the source during a predetermined period of time in response to the average load on the source during a prior period of time.

2. In combination an electric circuit and its source, a storage battery operatively arranged with respect to the circuit, and apparatus responsive to the load on the source and adapted to cause during a predetermined period of time a division of load between the battery and the source determined by the average load on the source during a prior period of time.

3. In combination an electric circuit and its source, a storage battery operatively arranged with respect to the circuit, two controlling devices whereof the first is adapted to control the battery operation and is responsive to departures of load on the source from a value fixed by the second while the second is adapted to adjust the first device with respect to said value and is responsive to departures of average load from a predetermined value, and means for preventing the first controlling device from affecting the battery operation during a given period of time and permitting it to affect said operation during a subsequent period.

4. In a system of electrical distribution the combination of a generating source and a storage battery with means adapted to cause the battery to discharge during a predetermined part of a given period of time to prevent the average load o· the source for the entire period from exceeding a predetermined amount.

5. In combination an electric circuit and its source, a storage battery operatively arranged with respect to the circuit, two controlling devices whereof the first is adapted to control the battery operation and is responsive to departures of load on the source from a value fixed by the second while the second is adapted to adjust the first device with respect to said value and is responsive to departures of average load from a predetermined value, means for preventing the first controlling device from affecting the battery operation during a given period of time and permitting it to affect said operation during a subsequent period, and an adjustable stop to limit the operation of the first controlling device in the charging direction.

6. In combination an electric circuit and its source, a storage battery operatively arranged with respect to the circuit, two controlling devices whereof the first is adapted to control the battery operation and is responsive to departures of load on the source from a value fixed by the second while the second is adapted to adjust the first device with respect to said value and is responsive to departures of average load from a predetermined value, means for preventing the second controlling device from affecting the battery operation during a given period of time and permitting it to affect said operation during a subsequent period, and a stop to limit the operation of the first controlling device in the charging direction.

7. In combination an electric circuit and its source, a battery connected to the circuit, means for controlling the battery charge and discharge including a coil for adjusting the same, means responsive to departures of average load on the source from a predetermined value and adapted to vary the effect of the adjusting coil, and means for preventing the adjusting coil from affecting the battery controlling means during a predetermined period of time and permitting said coil to affect said controlling means during a subsequent period.

8. In combination an electric circuit and its source, a battery connected to the circuit, means for regulating the operation of the battery, a device including two coöperating coils for controlling the regulating means, means for transmitting through one of said coils current varying with the load on the source, connections for transmitting current through the second coil, a device responsive to changes of average load on the source for adjusting the current strength in the second coil, and means for preventing the second coil from affecting the battery regulating means during a predetermined period of time and permitting said coil to act upon said regulating means during a subsequent period.

9. In combination an electric circuit and its source, a storage battery operatively arranged with respect to the circuit, means for controlling the operation of the battery and adapted to cause the battery to discharge when the load on the source exceeds a certain value but inoperative to affect the battery operation when said load is less than said value, and means for adjusting said value for the latter part of a given period of time, as determined by the average load on the source during the first part of said period.

10. In combination an electric circuit and its source, a storage battery operatively arranged with respect to the circuit, means for controlling the operation of the battery and adapted to cause the battery to discharge when the load on the source exceeds a certain value but inoperative to affect the battery operation when said load is less than said value, means for adjusting said value for the latter part of a given period of time as determined by the average load on the source during the first part of said period, and means for restoring the controlling and adjusting means at the end of said period to the same adjustment as at the begining of said period.

11. In combination an electric circuit and its source, a storage battery operatively arranged with respect to the circuit, a field coil for controlling the operation of the battery, apparatus including a second coil responsive to load on the source for regulating the current in the field coil, means for opposing the effect of said second coil and adapted to balance said effect at a certain point, a stop to limit the effect of the opposing means, a device for varying the point of balance between the second coil and the opposing means, means responsive to the average load on the source for adjusting the device last mentioned, and means for preventing any change of adjustment of the said device from affecting the battery operation during a predetermined period of time and permitting said device to affect said battery operation during a subsequent period.

12. In a system of electrical distribution, the combination of a generating source and a storage battery with means adapted to cause the battery to discharge in parallel with the source during part of a given period of time to prevent the average load on the source for the entire period from exceeding a predetermined amount.

In testimony whereof I have hereunto signed my name.

JOSEPH L. WOODBRIDGE.

Witnesses:
CLIFFORD K. CASSEL,
FRANK E. FRENCH.

Copies of this patent may be obtained for five cents each, by addressing the "Commissioner of Patents. Washington, D. C."